(12) United States Patent
Holst

(10) Patent No.: US 11,926,252 B2
(45) Date of Patent: Mar. 12, 2024

(54) TRACTOR-MOUNT TANK APPARATUSES, SYSTEMS AND METHODS

(71) Applicant: 360 YIELD CENTER, LLC, Morton, IL (US)

(72) Inventor: Brady M. Holst, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 1313 days.

(21) Appl. No.: 16/106,659

(22) Filed: Aug. 21, 2018

(65) Prior Publication Data

US 2019/0053422 A1 Feb. 21, 2019

Related U.S. Application Data

(60) Provisional application No. 62/617,458, filed on Jan. 15, 2018, provisional application No. 62/548,358, filed on Aug. 21, 2017.

(51) Int. Cl.
*B60P 3/22* (2006.01)
*A01C 15/00* (2006.01)
(Continued)

(52) U.S. Cl.
CPC .......... *B60P 3/2215* (2013.01); *A01C 15/005* (2013.01); *A01M 7/0085* (2013.01); *B62D 49/065* (2013.01); *A01C 23/008* (2013.01)

(58) Field of Classification Search
CPC ... B62D 49/065; B60P 3/2215; A01C 15/005; A01C 23/008; A01M 7/0085
(Continued)

(56) References Cited

U.S. PATENT DOCUMENTS 2,424,468 A * 7/1947 Keathley ............. A01M 7/0082
239/289
2,499,654 A * 3/1950 Kuhlman ............. B62D 49/065
280/760
(Continued)

FOREIGN PATENT DOCUMENTS

CN 105994241 A * 10/2016 .......... A01M 7/0014
DE 19500007 C1 * 12/1995 .......... A01B 59/064
(Continued)

OTHER PUBLICATIONS

DE-19500007-C1 English Translation of Description Retrieved from Espacenet (Year: 2022).*
(Continued)

*Primary Examiner* — Jacob D Knutson
*Assistant Examiner* — Abigail R Hymel
(74) *Attorney, Agent, or Firm* — Klintworth & Rozenblat IP LLP

(57) ABSTRACT

In one aspect, a liquid tank assembly is provided and configured to be mounted to a tractor. The liquid tank assembly includes a first tank configured to contain liquid, a second tank configured to contain liquid, a first support frame coupled to and supporting the first tank, and the first support frame includes a first mounting member configured to mount the first support frame to the tractor. The liquid tank assembly also includes a second support frame coupled to and supporting the second tank. The second support frame includes a second mounting member configured to mount the second support frame to the tractor, and the first support frame is coupled to the second support frame. In one aspect, a liquid tank assembly is provided and configured to be mounted to a tractor having a maximum width. A tank assembly width is no greater than a maximum width of the tractor.

10 Claims, 6 Drawing Sheets

(51) Int. Cl.
*A01C 23/00* (2006.01)
*A01M 7/00* (2006.01)
*B62D 49/06* (2006.01)

(58) Field of Classification Search
USPC .......................................... 280/833; 220/562
See application file for complete search history.

(56) References Cited

U.S. PATENT DOCUMENTS

| | | | | | |
|---|---|---|---|---|---|
| 2,743,934 | A | * | 5/1956 | Chambers | A01M 7/0085 280/833 |
| 2,946,598 | A | * | 7/1960 | Foster | B62D 49/06 280/830 |
| 3,311,183 | A | * | 3/1967 | Phillips | B62D 49/00 280/833 |
| 3,396,983 | A | * | 8/1968 | Massey | B62D 49/06 280/830 |
| 3,464,717 | A | * | 9/1969 | Davis | B60R 11/06 280/164.1 |
| 3,488,061 | A | * | 1/1970 | Hansen | A01M 7/0082 280/479.1 |
| 3,583,718 | A | * | 6/1971 | Meyer | A01M 7/0085 280/760 |
| 3,857,576 | A | * | 12/1974 | Wilt | B60P 3/30 280/833 |
| 3,900,201 | A | * | 8/1975 | Johnson | B60P 3/30 280/481 |
| 4,102,540 | A | * | 7/1978 | Fox | A01M 7/0085 280/833 |
| 4,130,295 | A | * | 12/1978 | Davis | A01B 59/048 280/412 |
| 4,149,734 | A | * | 4/1979 | Sylvester | A01M 7/0085 280/833 |
| 4,232,874 | A | * | 11/1980 | Ystebo | B60P 3/30 280/834 |
| 4,351,535 | A | * | 9/1982 | Mead | A01M 7/0085 280/760 |
| 4,383,590 | A | * | 5/1983 | van der Lely | B62D 61/10 180/69.6 |
| 6,286,870 | B1 | * | 9/2001 | Mulder | A01M 7/0085 280/833 |
| 6,550,811 | B1 | * | 4/2003 | Bennett | F02M 37/007 280/833 |
| 8,424,914 | B2 | * | 4/2013 | Honzek | B60K 15/077 280/834 |
| 2006/0074560 | A1 | | 4/2006 | Dyer | |
| 2012/0101861 | A1 | | 4/2012 | Lindores | |
| 2013/0048688 | A1 | * | 2/2013 | Mulder | A01M 7/0085 301/126 |
| 2013/0185104 | A1 | | 7/2013 | Klavins | |
| 2014/0089045 | A1 | | 3/2014 | Johnson | |
| 2015/0027793 | A1 | * | 1/2015 | Janzen | B60P 3/2215 220/4.12 |
| 2019/0359417 | A1 | * | 11/2019 | d'Alessandro | B60S 1/66 |

FOREIGN PATENT DOCUMENTS

| | | | | |
|---|---|---|---|---|
| DE | 29920602 U1 | * | 5/2000 | .......... A01M 7/0082 |
| FR | 1420533 A | * | 12/1965 | |
| GB | 1504697 A | * | 3/1978 | .......... A01M 7/0082 |
| WO | WO-2010002274 A1 | * | 1/2010 | |

OTHER PUBLICATIONS

Partial Supplementary European Search Report for European Patent Application No. 15811981.8 dated Nov. 20, 2017, 7 pages.

* cited by examiner

TRACTOR-MOUNT TANK APPARATUSES, SYSTEMS AND METHODS

RELATED APPLICATIONS

The present application claims the priority benefit of co-pending U.S. Provisional Patent Application Nos. 62/548,358, filed Aug. 21, 2017, and 62/617,458, filed Jan. 15, 2018, all of which are incorporated by reference herein.

FIELD OF THE DISCLOSURE

The present application generally relates to agricultural equipment and, more particularly, to agricultural equipment including tanks for containing crop inputs.

BACKGROUND

Tanks are mounted to tractors for supplying crop input (e.g., liquid crop input such as fertilizer) to implements such as planters or sprayers.

SUMMARY

In one aspect, a liquid tank assembly is provided and is configured to be mounted to a tractor. The liquid tank assembly includes a first tank configured to contain liquid, a second tank configured to contain liquid, and a first support frame coupled to and supporting the first tank. The first support frame includes a first mounting member configured to mount the first support frame to the tractor. The liquid tank assembly also includes a second support frame coupled to and supporting the second tank. The second support frame includes a second mounting member configured to mount the second support frame to the tractor. The first support frame is coupled to the second support frame.

In one aspect, the liquid tank assembly may further include a support member. The first support frame and the second support frame may be coupled together with the support member.

In one aspect, the support member may be coupled between and engage both the first support frame and the second support frame.

In one aspect, the support member may be configured to extend under an engine compartment of the tractor.

In one aspect, the support member may be a support beam.

In one aspect, the first support frame may further include a support bar and a pivot connection. The pivot connection may pivotally couple the first mounting member to the support bar.

In one aspect, the support bar may be rigidly coupled to the first tank, and the support bar and the first tank may be pivotal relative to the first mounting member and the tractor.

In one aspect, the support bar is a first support bar and the pivot connection is a first pivot connection. The second support frame may further include a second support bar and a second pivot connection. The second pivot connection may pivotally couple the second mounting member to the second support bar. The second support bar may be rigidly coupled to the second tank, and the second support bar and the second tank may be pivotal relative to the second mounting member and the tractor.

In one aspect a liquid tank assembly is provided and is configured to be mounted to a tractor having a maximum width and including a plurality of front wheels and a plurality of rear wheels opposite the front wheels. The liquid tank assembly includes a first tank configured to contain liquid. The first tank includes an interior wall configured to be proximate the tractor, an exterior wall opposite the interior wall, a front wall, and a rear wall opposite the front wall. The liquid tank assembly also includes a second tank configured to contain liquid. The second tank includes an interior wall configured to be proximate the tractor, an exterior wall opposite the interior wall, a front wall, and a rear wall opposite the front wall. The liquid tank assembly further includes a first support frame coupled to and supporting the first tank. The first support frame is configured to mount to the tractor, and the first support frame is configured to support the first tank over a first one of the plurality of front wheels. The liquid tank assembly further includes a second support frame coupled to and supporting the second tank The second support frame is configured to mount to the tractor, and the second support frame is configured to support the second tank over a second one of the plurality of front wheels. A tank assembly width is defined by a distance between the exterior wall of the first tank and the exterior wall of the second tank. The tank assembly width is no greater than the maximum width of the tractor.

In one aspect, the first support frame and the second support frame together may define a maximum support frame width, and the maximum support frame width may be no greater than the maximum width of the tractor.

In one aspect, no portion of the first tank, the second tank, the first support frame, and the second support frame may extend beyond the maximum width of the tractor.

In one aspect, the front wall of the first tank may be configured to be disposed to a front of the one of the plurality of front wheels and the rear wall of the first tank may be configured to be disposed to a rear of the one of the plurality of front wheels. The front wall of the second tank may be configured to be disposed to a front of the second one of the plurality of front wheels and the rear wall of the second tank may be configured to be disposed to a rear of the second one of the plurality of front wheels.

In one aspect, the first tank may include a bottom wall including a first portion and a second portion. The first portion of the bottom wall may be lower than the second portion of the bottom wall.

In one aspect, the first portion may be a front portion of the bottom wall and the second portion may be a rear portion of the bottom wall.

In one aspect, the first tank may include a liquid opening that is configured to be at least one of a liquid inlet or a liquid outlet. The liquid opening may be in the front wall of the first tank.

In one aspect, the liquid opening may be both a liquid inlet and a liquid outlet.

In one aspect, a liquid tank assembly is provided and is configured to be mounted to a tractor including a first front wheel, a second front wheel spaced-apart from the first front wheel, and an engine compartment between the first front wheel and the second front wheel. The engine compartment includes a hood movable between a closed position and an open position. The liquid tank assembly includes a tank including a plurality of walls together defining a receptacle configured to contain liquid and a support frame configured to support the tank over one of the first front wheel and the second front wheel. The support frame includes a first support member, a second support member and a gusset extending between the first support member and the second support member. The gusset is arcuate in shape and has a concave lower edge. The gusset is configured to extend over the hood of the engine compartment and be adequately spaced from the hood so as not to interfere with the hood as it moves between the open position and the closed position.

In one aspect, the first support member may be a substantially horizontal member and the second support member may be a substantially vertical member. The gusset may be coupled to and engage the substantially horizontal member and the substantial vertical member.

In one aspect, the substantially horizontal member may include a first end and a second end. The substantially vertical member may include a first end and a second end. The second end of the substantially vertical member may be connected to and engage the first end of the substantially horizontal member. The gusset may be connected to and engage the substantially vertical member proximate the first end of the substantially vertical member and may be connected to and engage the substantially horizontal member between the first end and the second end thereof.

In one aspect, the first support member, the second support member and the gusset may be all rigidly connected together. The support frame may further include a mounting member configured to mount the support frame to the tractor, and a pivot connection pivotally coupling the mounting member to one of the first support member and the second support member. The first support member, the second support member and the gusset may be configured to pivot together relative to the mounting member.

DETAILED DESCRIPTION

Figure 1:
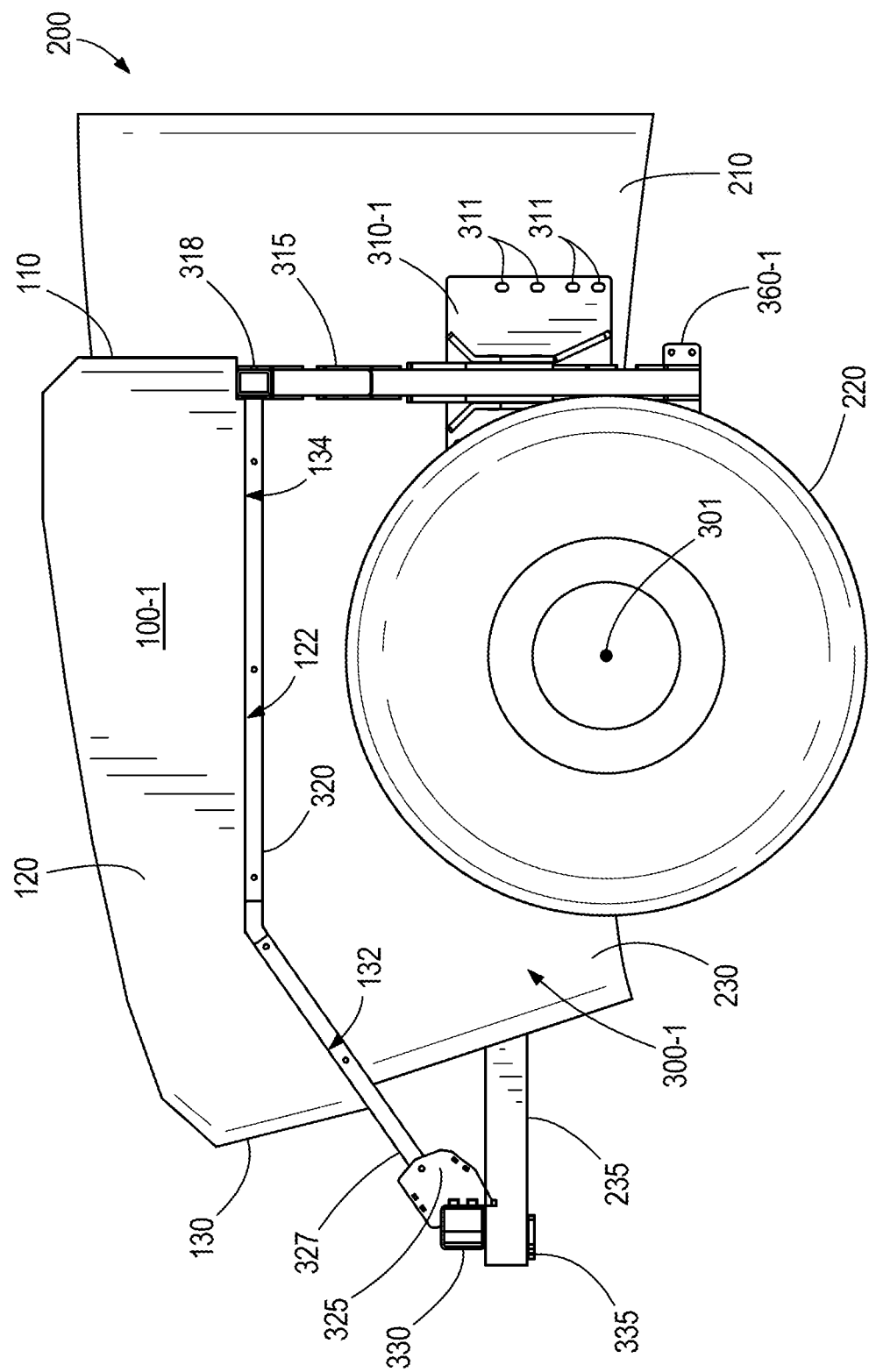
FIG. 1 is a left side elevation view of one example of a first tank and one example of a first tank support frame supported on a first side of one example of a tractor.
Figure 2:
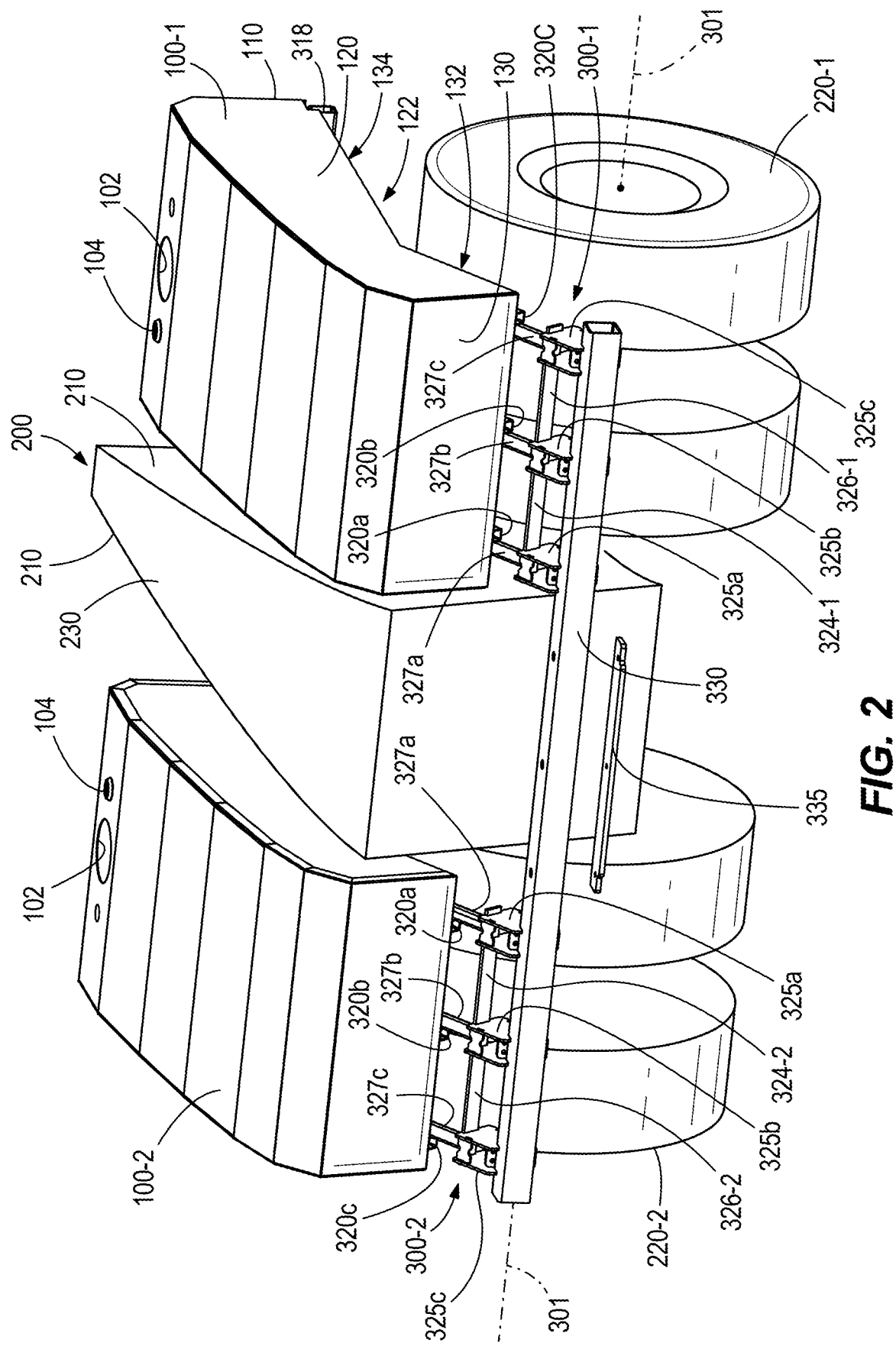
FIG. 2 is a top, front perspective view of the first tank and tank support frame of FIG. 1 and one example of a second tank and one example of a second support frame supported on a second side of the example of a tractor.

Referring to the drawings, wherein like reference numerals designate identical or corresponding parts throughout the several views, FIGS. 1-4 illustrate tanks 100-1, 100-2 supported on support frames 300-1, 300-2, respectively. The support frames 300 are optionally supported on a tractor 200. In one example, one or more of the tanks 100 are optionally supported on respective support frames 300 generally above an axis 301 of the front wheels 220 of the tractor 200. In one example, one or more of the tanks 100 are optionally disposed above one or more front wheels 220 (e.g., duals, as illustrated, or single tires) of the tractor 200. In one example, the tanks 100 are optionally supported generally on either side of an engine compartment 230 of the tractor 200.

As shown in the illustrated example, a medial portion 120 is disposed between a rear portion 110 and a forward portion 130 of the tank 100. In some examples, at least part of a bottom surface or wall 122 of the medial portion 120 is disposed higher than a bottom surface or wall 132 of the forward portion 130 (and/or a bottom surface or wall 134, see FIG. 2, of the rearward portion 110 in some examples). The medial portion 120 is optionally disposed above one or more front wheels 220 of the tractor 200. The forward portion 130 is optionally disposed, at least in part, above and in-front of the front wheels 220 of the tractor 200.

Figure 3:
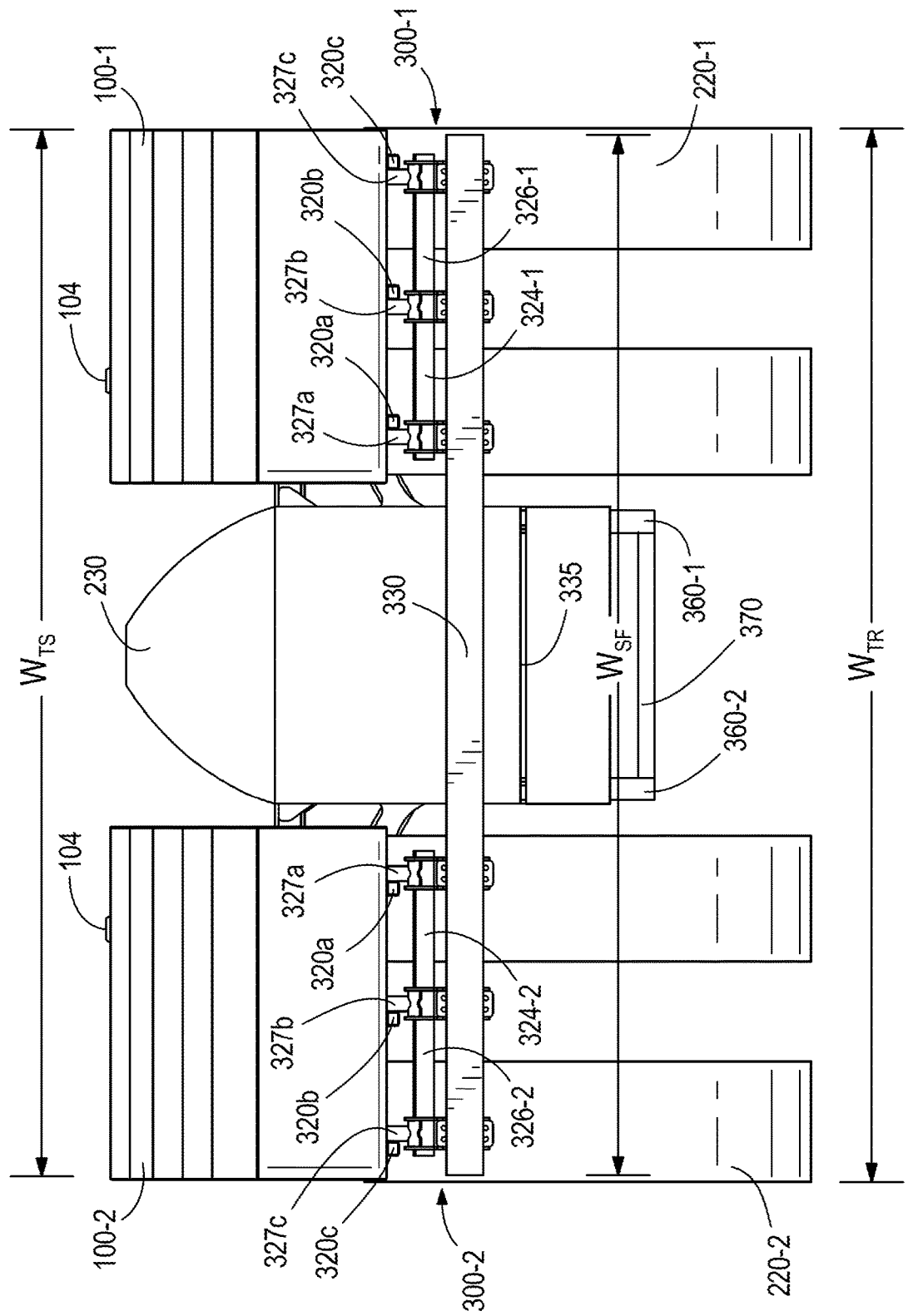
FIG. 3 is a front elevation view of the tanks and tank support frames of FIG. 2 supported on the example of a tractor.

Referring to FIG. 3, in some examples, an overall width $W_{TS}$ measured between a left end of the tank 100-1 and a right end of the tank 100-2 is optionally approximately equal to or less than an overall width $W_{TR}$ of the tractor such that the tanks 100 do not significantly increase the overall width of the tractor 200, if at all. In some examples, the width $W_{TS}$ is optionally approximately equal to or less than the overall width of an agricultural implement (e.g., planter) in its transport configuration disposed behind the tractor 200 such that the tanks 100 do not significantly increase an overall width of the tractor-implement combination, if at all. In some examples, the width $W_{TS}$ is optionally less than or equal to a legal width limit applied to over-the-road transportation. An overall width $W_{SF}$ of the support frames 300 is optionally approximately equal to or less than the width $W_{TS}$.

Each tank 100 optionally comprises a liquid container which may be used to store liquid such as liquid fertilizer or any other liquid input configured to be applied to a crop. One or more baffles (not shown) may be disposed inside of the tank 100 for alleviation of liquid sloshing; in some examples, such baffles extend transversely along at least part of the width of the tank and may include one or more openings.

Each tank 100 optionally includes an opening 102 (see FIG. 2) for supporting a removable lid. Each tank 100 optionally includes a vent or vent opening 104 (see FIGS. 2 and 3). Each tank 100 optionally includes a fluid inlet opening 105 (see FIG. 4) which may be fluidly coupled to a liquid source (not shown). Each tank 100 optionally includes a fluid outlet 106 (see FIG. 4) which may be fluidly coupled to an implement (not shown). Each tank 100 optionally includes one or more sight tube openings 108, 109 (see FIG. 4) which may be in fluid communication with a sight tube (removed in this example to expose openings 108, 109) for indicating the fluid level in the tank 100 to an operator.

Each tank 100 is optionally supported by an associated support frame 300. Each tank 100 is optionally mounted to (e.g., by welding or removably such as by removable fasteners) the associated support frame 300. Each support frame 300 is optionally mounted to and optionally at least partially supported at the side of the tractor 200 as described further herein. Each support frame 300 is optionally mounted to and optionally at least partially supported at the front of the tractor 200 as described herein. The support frames 300 are optionally coupled to one another (e.g., at a forward end of the tractor and/or beneath the tractor); however, in various alternative examples, the support frames 300 are independent and/or independently supported on the tractor 200.

Each support frame 300 optionally comprises one or more support bars 320 (e.g., square tubes, round tubes, etc.) which optionally extend generally forwardly from a laterally extending support bar 318. Each support bar 320 is optionally mounted (e.g., at a rearward end thereof) to support bar 318. In some examples, three support bars 320a, 320b, 320c are mounted to support bar 318 and disposed to support the tank 100. Each support bar 320 optionally has a generally downwardly and forwardly extending portion disposed forward of a generally forward-extending portion of the support bar 320.

The support bar 318 is optionally mounted to or otherwise supported on a support bar 315 which optionally extends vertically and is optionally disposed adjacent to the tractor 200. The support bar 315 is optionally mounted to a side portion 210 of the tractor 200 such as by a mounting member 310 (e.g., a mounting plate) having a plurality of holes 311 for bolts or other fasteners.

Each support frame 300 optionally comprises one or more support members 327 which optionally extend generally rearwardly from a laterally extending support bar 330. Each support member 327 is optionally coupled (e.g., by bolts) to an adjacent support bar 320. Each support member 327 is optionally mounted (e.g., at a forward end thereof) to support bar 330 (e.g., by one or more coupler plates 325). In some examples, three support bars 327a, 327b, 327c are mounted to support bar 330 and disposed to support the tank 100. Each support bar 327 optionally has a generally rearwardly extending portion disposed rearward of a generally upward and rearward extending portion of the support bar 327. The support bars 327 are optionally joined to one another by a lateral support comprising one or more laterally extending support portions 324, 326. In some examples, the support portions 324, 326 comprise a single plate or other unitary structure.

In some examples, the support bar 330 is disposed forward of an engine compartment of the tractor 200. The support bar 330 is optionally mounted to a front of the engine compartment (e.g., by bolting or otherwise securing to a front weight bracket 235 of the tractor). In some examples, front weight bracket 235 (see FIG. 1) is secured between the support bar 330 and a mounting plate 335 (e.g., by bolts or other fasteners extending through the weight bracket, support bar and mounting plate). In some examples, the support bar 330 is coupled to both support frames 300-1 and 300-2 as illustrated. In other examples, a separate support bar 330 may be provided separately on both support frames 300-1, 300-2 and optionally independently coupled to the tractor 200.

Figure 4:
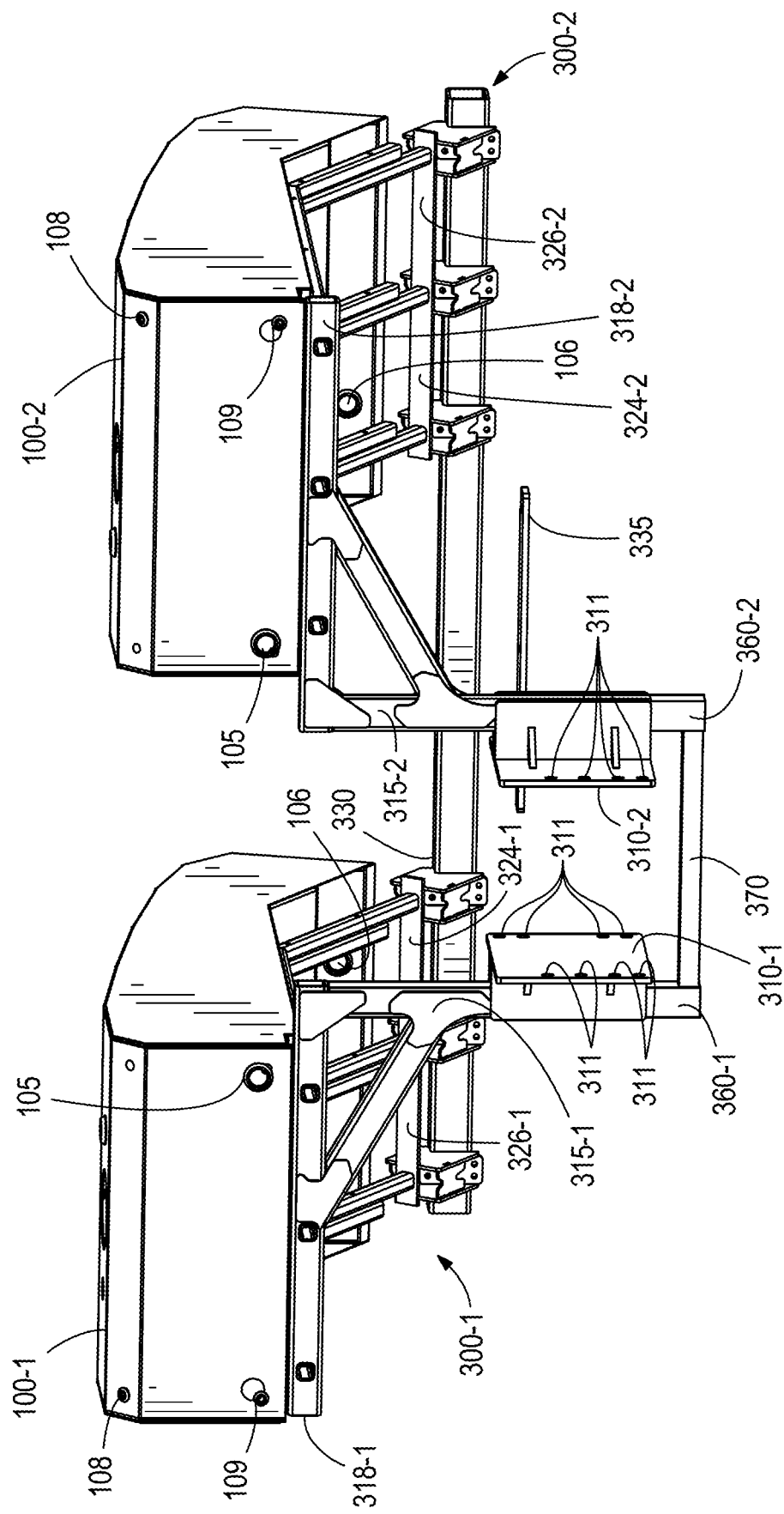
FIG. 4 is a rear perspective view of the tanks and tank support frames of FIG. 2.

In some examples, the support frames 300-1, 300-2 are coupled beneath the tractor 200, such as by a laterally extending support member 370 (e.g., support bar or beam 370 in FIGS. 3 and 4). In some examples, a bracket 360-1 couples (e.g., rigidly couples) the support bar 370 to the mounting plate 310-1 and/or to the support bar 315-1. In some examples, a bracket 360-2 couples (e.g., rigidly couples) the support bar 370 to the mounting plate 310-2 and/or to the support bar 315-2.

Figure 5:
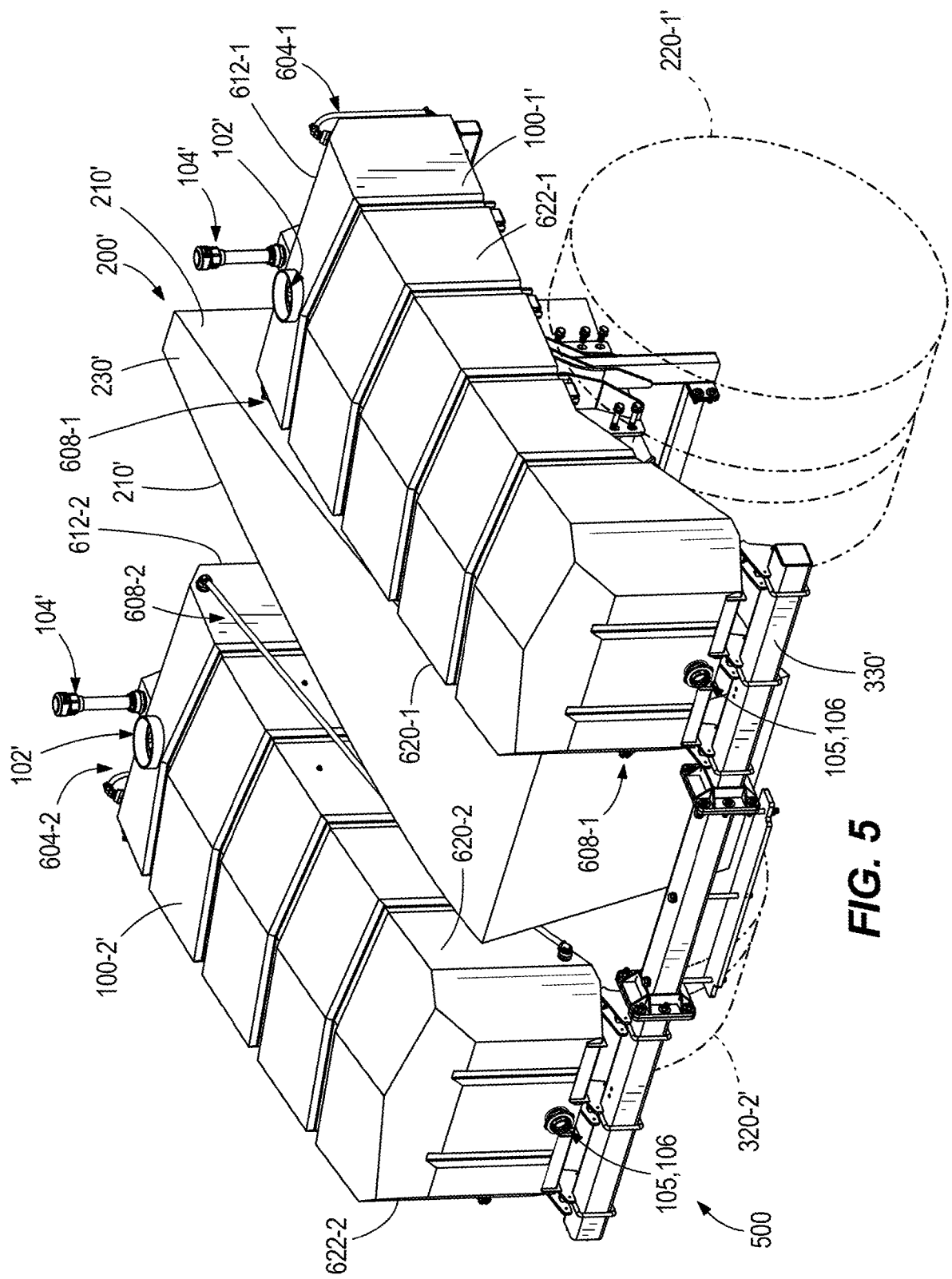
FIG. 5 is a top, front perspective view of one example of a tank support frame and one example of tanks supported on one example of portion of a tractor.
Figure 6:
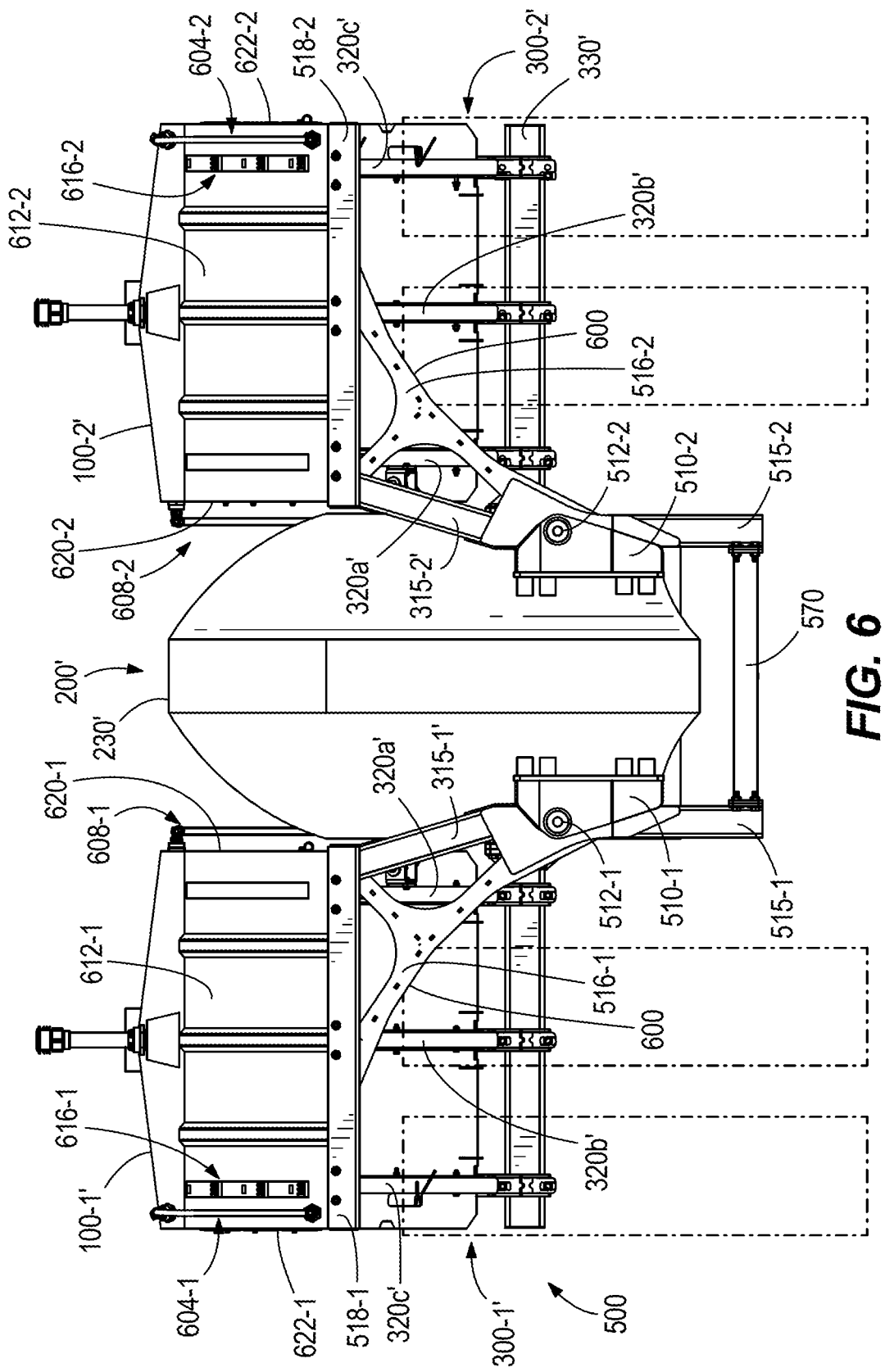
FIG. 6 is a rear elevation view of the tanks and tank support frames of FIG. 5.

Referring to FIGS. 5 and 6, another example of a tank support frame 500 for supporting tanks 100-1', 100-2' to a side of an engine compartment 230' of a tractor 200'. The tank support frame 500 optionally has certain common features and/or functionality with the tank support frames 300-1, 300-2 described above. With particular reference to FIG. 6, the tank support frame 500 is optionally pivotally coupled to supports 510-1, 510-2 which are optionally mounted on opposing sides of the engine compartment 230'. In the illustrated example, vertical supports 515-1, 515-2 (e.g., beams or other structure) are pivotally coupled at pivot connections 512-1, 512-2, respectively, to supports 510-1, 510-2, respectively. The supports 510 optionally comprise one or more plates or other structure and are optionally removably mounted to the tractor 200' (e.g., to opposing sides of the engine compartment 230'). Lateral supports 518-1, 518-2 are optionally coupled to the vertical supports 515-1, 515-2. The lateral supports 518-1, 518-2 at least partially support the tank 100-1, 100-2, respectively. A gusset 516 optionally additionally rigidly links each lateral support 518 to each vertical support 515. In some examples, the gusset 516 has an arcuate or curved shape, thereby providing a lower surface or edge 600 of the gusset 516 with an arcuate or curved shape. In one example, the lower surface or edge 600 of the gusset 516 is concave. This arcuate lower surface 600 positions the gusset 516 a sufficient distance away from a hood of the tractor 200', thereby allowing the tractor hood to be raised and lowered between a closed position and an open position without interfering with the gussets 516 while the tanks 100 and support frames 300 are mounted to the tractor 200'. This gusset 516 allows the components of the tractor under the hood to be serviced without having to remove the tanks 100 and support frame 300 from the tractor.

In one example, the supports 510 are optionally coupled (e.g., rigidly coupled) to one another such as by a laterally extending support member (e.g., support bar or beam 570). In some examples, the support bar 570 is positioned under the tractor 200' and/or the engine compartment 230' and is coupled, at its ends, to the vertical supports 515-1, 515-2. The support bar 570 may be coupled to the vertical supports 515-1, 515-2 in a variety of manners including fastening, welding, or unitarily forming the support bar 570 with the vertical supports 515-1, 515-2.

The support bar 570 couples or ties the two tanks 100-1', 100-2' together, thereby causing the tanks 100-1', 100-2' to distribute forces to each other than exerting all forces to the tractor, which would occur if the two tanks were independent from each other and were not coupled or tied together in any manner. In some examples, at least a portion of the weight of the tanks 100-1, 100-2 applies opposing moments about the pivot connections 512-1, 512-2, optionally placing the support bar 570 in compression. The pivot connections 512 optionally reduce a stress (e.g., maximum stress) on the vertical support members 515 and/or lateral support members 518 as compared to an alternative example equivalent to the frame 500, but in which the vertical support members are rigidly connected rather than pivotally connected to the tractor 200'.

In some examples, the tanks and associated components disclosed herein may provide a more lateral force or load to a tractor, whereas prior tanks and associated components apply a more significant vertical downward force to or load on the tractor.

With continued reference to FIGS. 5 and 6, in some examples, each tank 100' includes a rear level gauge 604 and a side level gauge 608. The rear gauge 604 is coupled to a rear wall or surface 612 of the tank 100' toward a top of the tank 100' and extends down the rear wall 612 to a bottom of the tank 100'. A level indicator 616 is provided on the rear wall 612 of the tank 100' adjacent the rear level gauge 604 to provide reference information (e.g., how much liquid remains in the tank) to an operator of the tractor 200'. The side level gauge 608 is positioned on an interior wall 620 of each of the tanks 100'. The interior walls 620 of the tanks 100' are proximate the engine compartment 230' of the tractor 200' while exterior walls 622 are on opposite sides of the tanks 100'. Each side level gauge 608 extends along the interior wall 620 of the tank 100' from a top, rear corner of the interior wall 620 to a bottom, front corner of the interior wall 620. This side level gauge 608 also indicates a level of liquid in the associated tank 100'.

Each support bar described herein may be hollow, solid, comprise a three-sided beam, comprise a four-sided beam, have an open cross-sectional geometry, have a closed cross-sectional geometry, have a polygonal cross-sectional geometry, have an arcuate cross-sectional geometer, have a combination polygonal and arcuate cross-sectional geometer, or be of any other configuration. Each component described herein, including the various support bars, may be made of metal, polymer or other suitable material.

Although various examples have been described above, the details and features of the disclosed examples are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one example or embodiment may be used in any other example or embodiment to any extent and in any combination.

The invention claimed is:

1. A liquid tank assembly configured to be mounted to a tractor, the liquid tank assembly comprising:
    a first tank configured to contain liquid;
    a second tank configured to contain liquid;
    a first support frame coupled to and supporting the first tank, wherein the first support frame includes a first mounting member configured to mount the first support frame to the tractor;
    a second support frame coupled to and supporting the second tank, wherein the second support frame includes a second mounting member configured to mount the second support frame to the tractor;
    a support member, the support member extending, at back ends of the first support frame and the second support frame, to and between lateral inner ends of the first support frame and the second support frame; and
    a lateral support bar extending, at front ends of the first support frame and the second support frame, to and between lateral outer ends of the first support frame and the second support frame.

2. The liquid tank assembly of claim 1, wherein the support member is configured to extend under an engine compartment of the tractor.

3. The liquid tank assembly of claim 1, wherein the support member is a support beam.

4. The liquid tank assembly of claim 1, wherein the first support frame further includes a support bar and a pivot connection, wherein the pivot connection pivotally couples the first mounting member to the support bar.

5. The liquid tank assembly of claim 4, wherein the support bar is rigidly coupled to the first tank, and wherein the support bar and the first tank are pivotal relative to the first mounting member and the tractor.

6. The liquid tank assembly of claim 5, wherein the support bar is a first support bar and the pivot connection is a first pivot connection, wherein the second support frame further includes a second support bar and a second pivot connection, wherein the second pivot connection pivotally couples the second mounting member to the second support bar, and wherein the second support bar is rigidly coupled to the second tank, and wherein the second support bar and the second tank are pivotal relative to the second mounting member and the tractor.

7. A liquid tank assembly configured to be mounted to a tractor including a first front wheel, a second front wheel spaced-apart from the first front wheel, and an engine compartment between the first front wheel and the second front wheel, the engine compartment including a hood movable between a closed position and an open position, the liquid tank assembly comprising:
    a tank including a plurality of walls together defining a receptacle configured to contain liquid; and
    a support frame configured to support the tank over one of the first front wheel and the second front wheel, wherein the support frame includes a first support member, a second support member and a gusset extending between the first support member and the second support member, wherein the gusset is arcuate in shape and has a concave lower edge, and wherein the gusset is configured to extend over the hood of the engine compartment and be adequately spaced from the hood so as not to interfere with the hood as the hood moves between the open position and the closed position.

8. The liquid tank assembly of claim 7, wherein the first support member is a substantially horizontal member and the second support member is a substantially vertical member, wherein the gusset is coupled to and engages the substantially horizontal member and the substantial vertical member.

9. The liquid tank assembly of claim 8, wherein the substantially horizontal member includes a first end and a second end, wherein the substantially vertical member includes a first end and a second end, wherein the second end of the substantially vertical member is connected to and engages the first end of the substantially horizontal member, and wherein the gusset is connected to and engages the substantially vertical member proximate the first end of the substantially vertical member and is connected to and engages the substantially horizontal member between the first end and the second end thereof.

10. The liquid tank assembly of claim 7, wherein the first support member, the second support member and the gusset are all rigidly connected together, wherein the support frame further includes
    a mounting member configured to mount the support frame to the tractor, and
    a pivot connection pivotally coupling the mounting member to one of the first support member and the second support member;
    wherein the first support member, the second support member and the gusset are configured to pivot together relative to the mounting member.

* * * * *